United States Patent [19]
Mitchell

[11] Patent Number: 5,698,982
[45] Date of Patent: Dec. 16, 1997

[54] METHOD AND SYSTEM FOR SKIN EFFECT CORRECTION IN A MULTIPLE TRANSMIT FREQUENCY INDUCTION LOGGING SYSTEM

[75] Inventor: William K. Mitchell, Arlington, Tex.

[73] Assignee: Computalog Research, Inc.

[21] Appl. No.: 617,418

[22] Filed: Mar. 18, 1996

[51] Int. Cl.$^6$ .................. G01V 3/28; G01V 3/38
[52] U.S. Cl. ............ 324/339; 324/225; 364/422
[58] Field of Search ............ 324/225, 338–343; 364/422

[56] References Cited

U.S. PATENT DOCUMENTS

| | | | |
|---|---|---|---|
| 3,706,025 | 12/1972 | Regat | 324/339 |
| 4,467,425 | 8/1984 | Schaefer et al. | 324/339 X |
| 5,500,597 | 3/1996 | Tickell, Jr. et al. | 324/339 |

Primary Examiner—Gerard R. Strecker
Attorney, Agent, or Firm—Andrew J. Dillon

[57] ABSTRACT

An induction logging tool is disclosed for utilization in conjunction with surface electronic equipment for measuring a characteristic of subsurface formations. A transmit signal which is comprised of a repetitive sequential series of at least three transmit frequencies is generated by coupling an oscillator to a transmitter coil and a plurality of selectable tuning capacitors. A signal characteristic of the response of the formation to this transmit signal is detected at a receiver coil array and two phase sensitive detectors are then utilized to generate output signals indicative of the magnitude of the X and R components of the formation signal which is in phase with a reference phase signal. The output signal of each phase sensitive detector is then utilized to accurately determine the X and R component of the receiver coil signal for each frequency by nulling the output of the phase sensitive detector utilizing a closed loop conversion circuit which eliminates errors due to phase and gain variations. The X and R signals from two or more frequencies are then utilized to correct for skin effect in both magnitude and spatial response.

6 Claims, 7 Drawing Sheets

METHOD AND SYSTEM FOR SKIN EFFECT CORRECTION IN A MULTIPLE TRANSMIT FREQUENCY INDUCTION LOGGING SYSTEM

CROSS-REFERENCE TO RELATED APPLICATION

The present application is related to U.S. patent application Ser. No. 08/099,621, filed Jul. 30, 1993, further identified as U.S. Pat. No. 5,500,597, issued Mar. 19, 1996 assigned to the assignee herein named, and incorporated by reference herein.

BACKGROUND OF THE INVENTION

1. Field of the Invention

The present invention relates in general to electrical induction logging systems for determining the characteristics of subsurface formations and in particular to an electrical induction logging system which utilizes multiple frequencies to measure the conductivity of subsurface formations. Still more particularly, the present invention relates to an improved skin effect correction technique for utilization in a multiple frequency electrical induction logging system.

2. Description of the Prior Art

The nature and characteristics of various subsurface formations penetrated by a borehole are important considerations in the oil and gas industry during the drilling of that borehole. The existence, depth, location, quantity and other parameters concerning the oil and gas trapped within formations must be determined. Various techniques have been employed in the past to determine this information regarding formations penetrated by a borehole. One technique commonly utilized is induction logging. Induction logging measures the resistivity (or conductivity) of a formation by first inducing eddy currents to flow within these formations in response to an alternating current transmitter signal and then measuring a phase component signal in a received signal which is generated by the presence of those eddy currents. Variations in the magnitude of the eddy currents in response to variations in formation conductivity are then reflected as variations in the receiver signal. Thus, in general, the magnitude of a phase component of the receiver signal, that component in-phase with the transmitter signal, is indicative of the conductivity of a formation.

In theory, the electrical resistivity of a formation should be relatively high when that formation contains a high percentage of hydrocarbons due to the fact that hydrocarbons are a poor conductor of electricity. Where hydrocarbons are not present in the formations and the formations contain salt water, the electrical resistivity of a formation should be relatively low. Formation water, which is typically highly saline, is a relatively good conductor of electricity. Induction resistivity logging tools thus obtain information regarding the formations which may be interpreted to indicate the presence or absence of hydrocarbons.

U.S. Pat. Nos. 3,340,464, 3,147,429, 3,179,879, and 3,056,917 are illustrative of typical prior art well logging tools which utilize the basic principles of induction logging. In each of the tools disclosed within these patents, a signal generator operates to produce an alternating current transmitter signal which is applied to a transmitter coil. The current in the transmitter coil induces a magnetic field in the surrounding formations. This magnetic field, in turn, causes eddy currents to flow within the formations. Because of the presence of these formation currents, a magnetic field is coupled into a receiver coil, thereby generating a receiver signal. Those skilled in the art will appreciate that such logging tools typically include a receiver coil and a transmitter coil which may each be comprised of multiple coils arranged in a predetermined fashion to obtain a desired response. The receiver signal is typically then amplified and applied to one or more Phase Sensitive Detectors (PSD). Each Phase Sensitive Detector then detects a phase component signal having the same phase as a phase reference signal which is also applied to the detector. The phase reference signal has a predetermined phase relationship to the current in the transmitter coil and the output of the phase sensitive detector may be further processed downhole or may be sent to the surface for processing by surface equipment.

A quantative determination of the conductivity of formations surrounding a borehole is based in large part on the value obtained for the phase component that is in phase with the transmitter current in the transmitter coil. This component signal is typically referred to as the real or "R" phase component. Measurement of a phase component signal which has a phase orthogonal to the transmitter current is sometimes obtained. This component signal is generally referred to as the "X" phase component signal.

Measurement of both the R and X phase component signals of the receiver signal is well known. U.S. Pat. Nos. 3,147,429 and 3,179,879 both disclose induction logging tools which detect phase quadrature components of the receiver signal from the receiver coil. The tools disclosed in these patents show the output from a receiver amplifier being applied to identical phase sensitive detector circuits, one for detecting the R component signal and the other for detecting the X component signal. Appropriate phase shifting components are provided for generating the phase quadrature phase reference signals required for the phase sensitive detectors, in order to resolve the phase component signals.

Numerous patents have been issued which disclose techniques for eliminating phase shift errors which may be present in induction logging tools. These errors generally arise as static phase shift errors and dynamic or temperature dependent phase shift errors. Static phase shift errors are those phase shifts which occur when the tool is operated at a steady temperature condition. These phase shift errors are introduced into the detected phase component by certain electrical components within the tool. Dynamic phase shift errors occur as a result of the influences of temperature drift on the detection circuits.

U.S. Pat. No. 3,340,464 discloses a circuit for automatically adjusting the varying phase shifts which occur as a result of temperature drift by deriving a test signal from the current in the transmitter coil and thereafter substituting this test signal for the normal receiver coil output signal, generating a quadrature reference signal to the phase sensitive detector to detect a phase component within the receiver signal, and, phase shifting the reference signal as a function of the magnitude of the detected phase component signal in a direction to minimize that signal. This phase error compensation circuit does not attempt to segregate the relatively fixed or constant phase errors which arise within a tool from temperature dependent phase errors which vary with time during logging and resulting from component drift within the circuits. That is, this technique attempts to compensate for any and all phase shifts, regardless of the source of those phase shifts, which have occurred since the last phase compensation.

Another known phenomena in induction logging is the difference in the formation response as a function of frequency and formation conductivity. In general, the response signal received by an induction tool at low conductivities increases as the square of the frequency for a constant transmitter current. Because of the greater formation response at higher frequencies than at lower frequencies over most of the conductivities encountered, it becomes apparent that a low distortion transmitter signal is required. The more distorted a transmitter signal is the larger in amplitude are the harmonics of the fundamental frequency. Such harmonics propagate through the formation from the transmitter to the receiver with an attenuation and phase shift which are not related to those of the fundamental frequency. Thus, these effects may introduce false signals into the receiver that may cause a misleading result to be obtained from the induction tool measurement.

The variation in formation response with frequency may also be utilized beneficially to extend the range of formation resistivity that may be accurately measured by an induction logging tool. At high formation conductivities and higher frequencies a phenomena known as "skin effect" causes a loss of proportionality between the receive signal and the formation conductivity, introducing additional complexity in the interpretation of the signals.

Skin effect is a reduction of the measured induction signal which is observed in conductive formations. This reduction is the result of two effects. First, as an electromagnetic wave travels through a formation, it will undergo a phase shift that is related to the conductivity. This will result in a smaller R signal but a larger X signal. Secondly, in a conductive formation, an electromagnetic wave will be attenuated causing a reduction of the R signal. Because both sources of skin effect are caused by conductivity in the formation, the skin effect will go to zero as the conductivity goes to zero. Since skin effect will cause the response of the induction curves to change with conductivity, accurate corrections for skin effect are necessary before deconvolution filters can be applied.

The conventional approach to correct for skin effect is to boost the signal by the amount that would be correct in a homogeneous formation. The homogeneous skin effect correction can be determined by modeling the tool in homogeneous formations of different conductivities. These results are shown in Table I for deep 20 kHz measurements. The skin effect error is the difference between the actual conductivity and the measured R signal conductivity. The skin effect error increases with conductivity. Thus, at 1 mS/m conductivity (1000 ohmm.), the skin effect error is only 1% of the measurement, but at 5000 mS/m (0.2 ohmm.) the skin effect error is actually greater than the measured R signal. The relationship between the R signal and the true conductivity can be used to correct the R signal for skin effect. This boosting of the R signal will give the correct result in homogeneous formations. However, since there is no information about the spatial contribution of the skin effect in the boosting approach, it will not be correct in some heterogeneous formations.

TABLE I

| Formation Conductivity mS/m | Deep R 20 kHz mS/m | Deep Skin Effect mS/m | Deep X 20 kHz mS/m |
|---|---|---|---|
| 5000. | 2074.59 | 2925.41 | 1619.15 |
| 1000. | 718.03 | 281.97 | 215.57 |
| 500. | 399.23 | 100.77 | 83.22 |
| 100. | 90.90 | 9.10 | 8.34 |
| 50. | 46.78 | 3.22 | 3.03 |
| 10. | 9.71 | .29 | .28 |
| 5. | 4.90 | .10 | .10 |
| 1. | .99 | .01 | .01 |

Another known approach to correct for skin effect is to add the X signal to the R signal. As shown by the modeling results in Table I above, the X signal is nearly equal to the skin effect. The X signal is boosted to the correct value of skin effect by multiplying it by a parameter that itself depends on the X signal. The equation for this correction is:

$$COND_{corr} = R + aX \quad (1)$$

where:

$COND_{corr}$ is the conductivity corrected for skin effect; and

"a" is a parameter used to boost the X signal to the skin effect needed for a homogeneous formation.

The parameter "a" is actually a function that depends on X. The function is determined by fitting an equation to the model data. Since the X signal itself is a measurement affected by surrounding beds, it will contain spatial information. As a result, using the X signal to correct for skin effect will be more accurate than boosting the R signal in heterogeneous formations. While this type of correction is more accurate than boosting the R signal, it also has some errors in its spatial response resulting in errors in a heterogeneous formation.

The response function can be determined by modeling a thin conductive streak in a low conductive formation. The response function is produced by normalizing the modeling results. The background conductivity is removed by subtracting the conductivity at the ends of the model. Thereafter, each point is divided by the sum of all the points. The result is a response function that will be zero at some distance from the streak and will sum to one.

Figure 1:
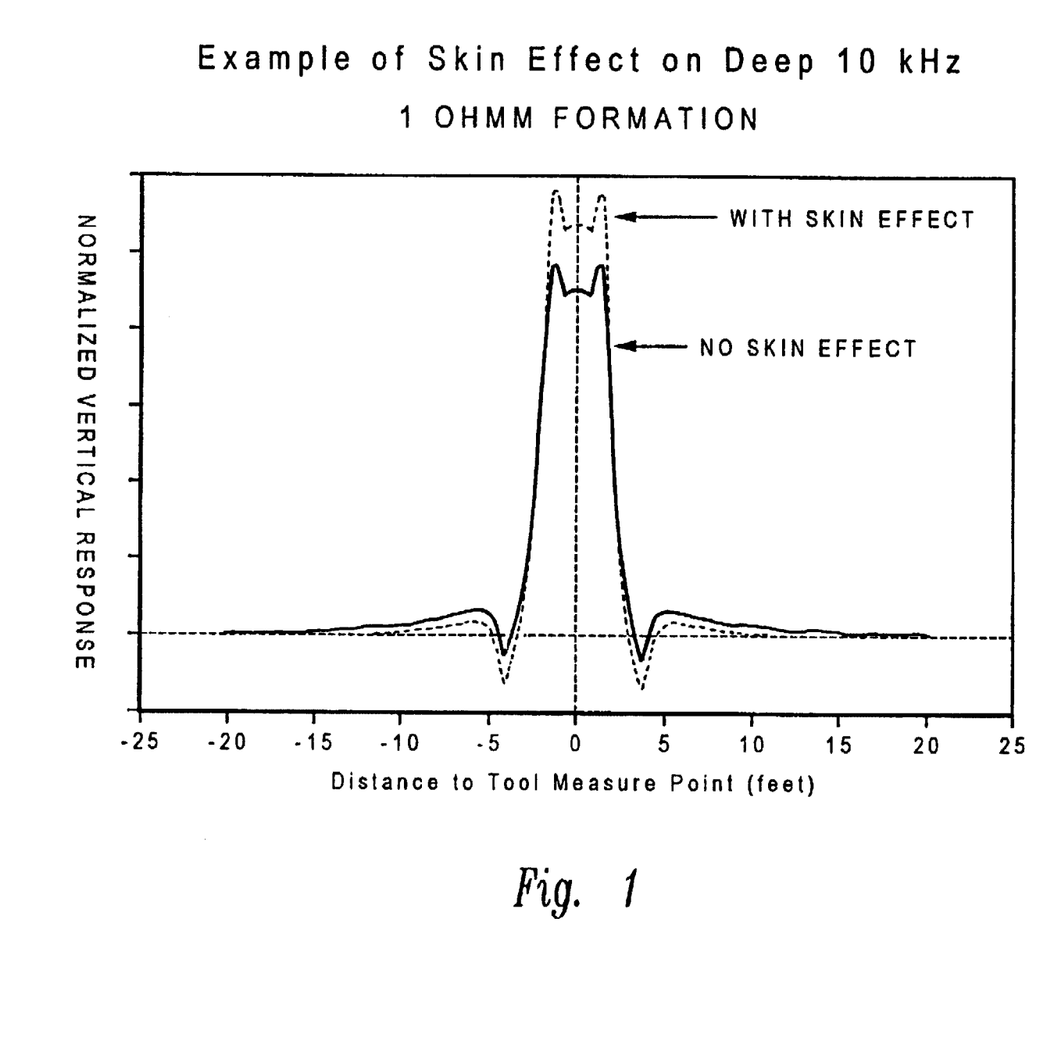
FIG. 1 is a graphic illustration of the results of modeling and normalizing a 10 KHz deep induction R signal in a 1000 ohm formation with a conductive thin layer and a 1 ohm formation with a thin conductive layer.
Figure 2:
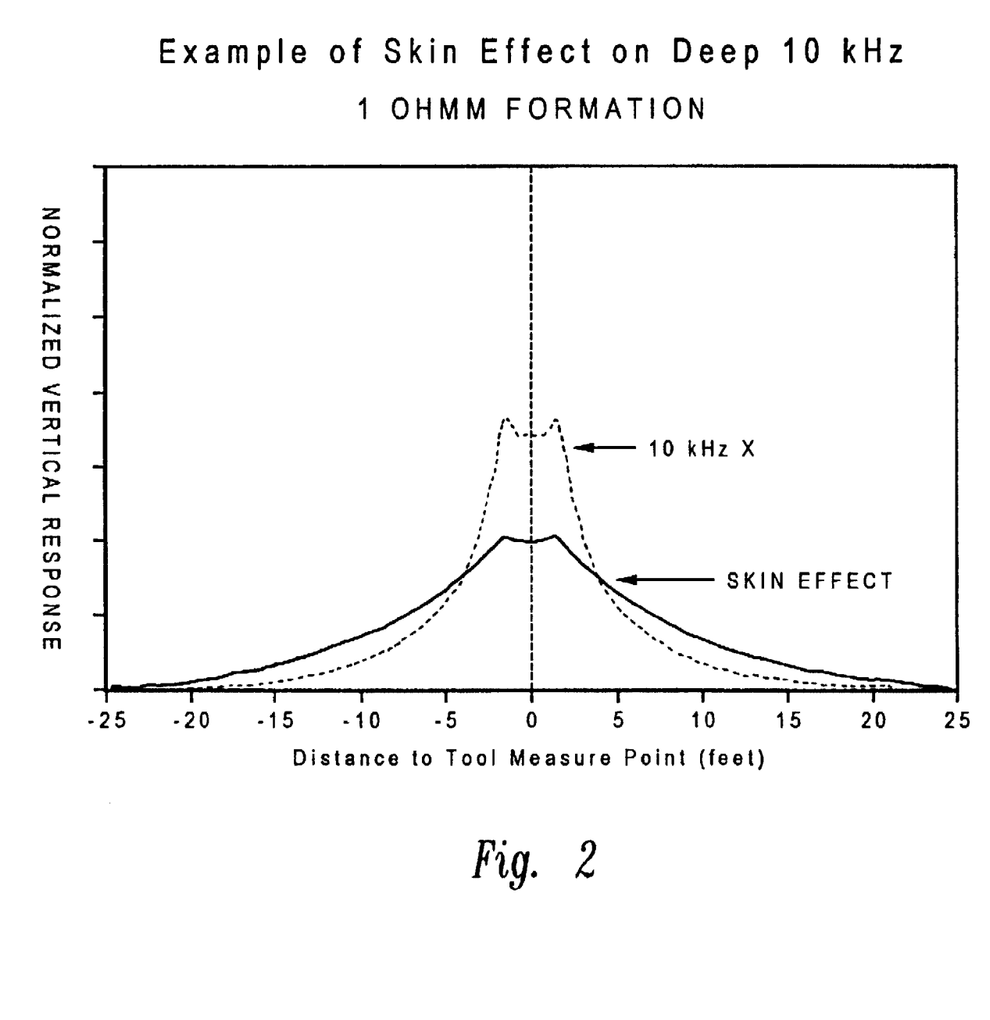
FIG. 2 is a graphic illustration of the normalized response of the skin effect of the 10 KHz deep induction R signal in a 1 ohm formation along with the normalized response function of the 10 KHz deep induction X signal.

FIG. 1 illustrates the results of modeling and normalizing a 10 kHz deep-induction R signal in both a 1000-ohmm formation with a conductive thin streak and a 1-ohmm formation with a thin conductive streak. The normalized result in the 1000-ohmm bed has negligible skin effect and is labeled "NO SKIN EFFECT." The normalized result in the 1-ohmm formation is labeled "WITH SKIN EFFECT." The difference between the two results shows the spatial contribution to the skin effect for this case. The normalized vertical response function of the skin effect for the 10-kHz deep R signal in a 1-ohmm formation can be determined by normalizing the difference between the two modeling results. FIG. 2 illustrates the normalized response of the skin effect of the 10-kHz R signal in a formation of 1 ohmm along with the normalized response function of the 10-kHz X signal. In FIG. 2, the X signal does not quite match the response needed to correct the 10-kHz R signal for skin effect.

An approach utilized in the prior art by Schaefer et al, U.S. Pat. No. 4,471,436 is to apply a vertical filter to the X signal to cause it to match the required skin effect. Since the skin effect changes with conductivity, a non-linear filter that also changes with conductivity is required. This technique produces a skin effect correction that is spatially correct in the vertical direction but does not take into consideration any spatial effect from the radial direction.

In view of the above, it should be apparent that a need exists for an improved method and system for skin effect correction in an induction logging system which utilizes accurate information regarding the spatial contribution of the skin effect.

SUMMARY OF THE INVENTION

It is therefore one object of the present invention to provide an improved electrical induction logging system for detecting the characteristics of subsurface formations.

It is another object of the present invention to provide an improved electrical induction logging system which utilizes multiple frequencies to measure the conductivity of subsurface formations.

It is yet another object of the present invention to provide an improved skin effect correction technique for utilization in a multiple frequency electrical induction logging system.

The foregoing objects are achieved as is now described. An induction logging tool is disclosed for utilization in conjunction with surface electronic equipment for measuring a characteristic of subsurface formations. A transmit signal which is comprised of a repetitive sequential series of at least three transmit frequencies is generated by coupling an oscillator to a transmitter coil and a plurality of selectable tuning capacitors. A signal characteristic of the response of the formation to this transmit signal is detected at a receiver coil array and two phase sensitive detectors are then utilized to generate output signals indicative of the magnitude of the X and R components of the formation signal which is in phase with a reference phase signal. The output signal of each phase sensitive detector is then utilized to accurately determine the X and R component of the receiver coil signal for each frequency by nulling the output of the phase sensitive detector utilizing a closed loop conversion circuit which eliminates errors due to phase and gain variations. The X and R signals from two or more frequencies are then utilized to correct for skin effect in both magnitude and spatial response.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figures 3, 5:
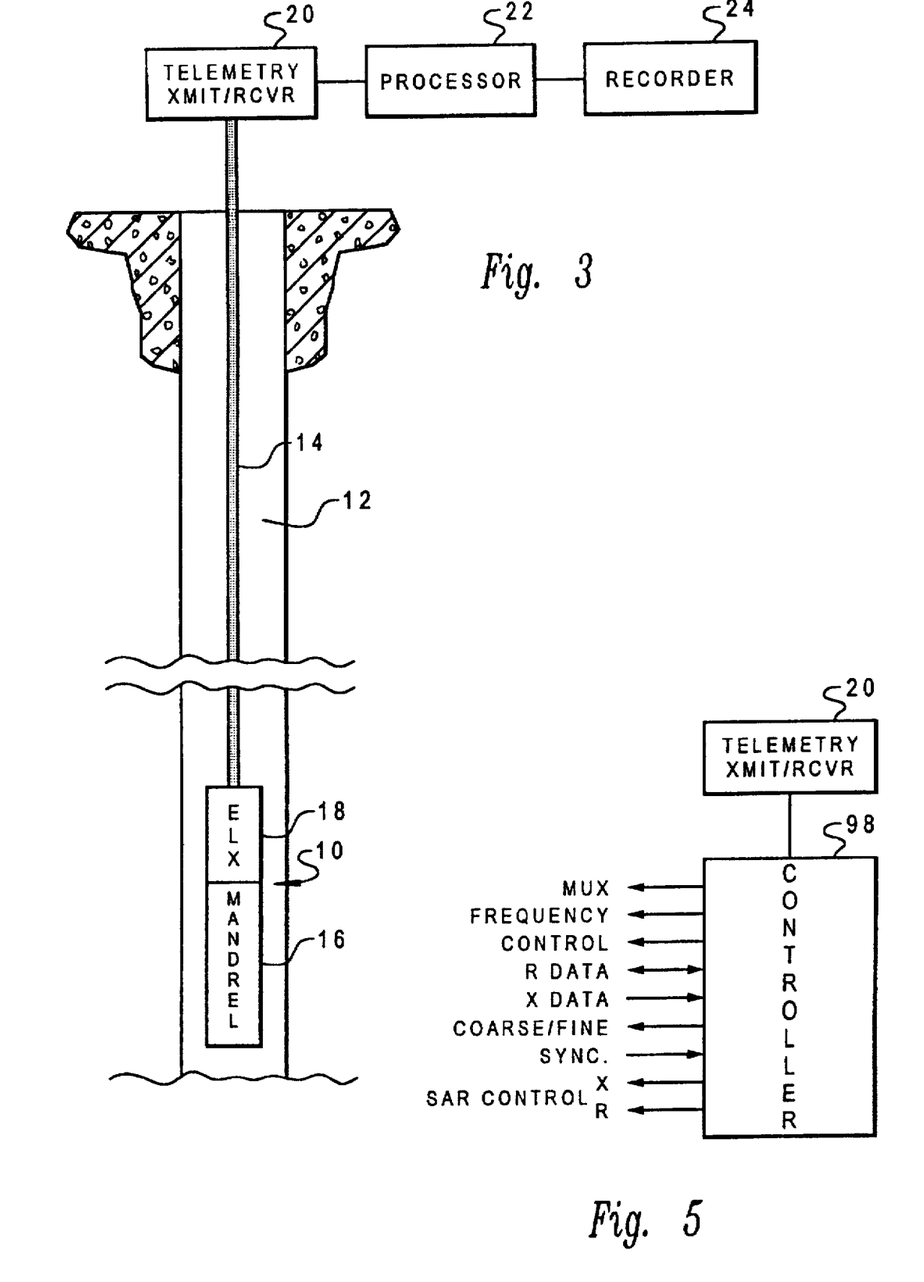
FIG. 3 is a pictorial illustration of a multiple frequency induction logging system for logging a borehole.
FIG. 5 is a high level block diagram of a telemetry and control circuit utilized in the multiple frequency induction logging system of FIG. 3.

With reference now to the figures and in particular with reference to FIG. 3, there is depicted a pictorial illustration of a multiple frequency induction logging system for logging a borehole in accordance with the present invention. As illustrated, an induction logging tool 10 is suspended within a borehole 12 by means of a wireline 14. Induction logging tool 10 preferably includes a mandrel section 16 and an electronics cartridge 18, greater details of which will be provided herein. As those skilled in the art will appreciate, induction logging tool 10 preferably includes a plurality of transmit and receive coils which are preferably disposed about mandrel 16 in a manner similar to that disclosed in U.S. Pat. No. 3,329,889.

As is typical in such induction logging systems, induction logging tool 10 is coupled to selected surface electronics via wireline 14 and telemetry transmitter/receiver 20. A processor 22 and recorder 24 are also preferably provided for manipulation of signals generated utilizing induction logging tool 10 and the recording thereof.

Figure 4:
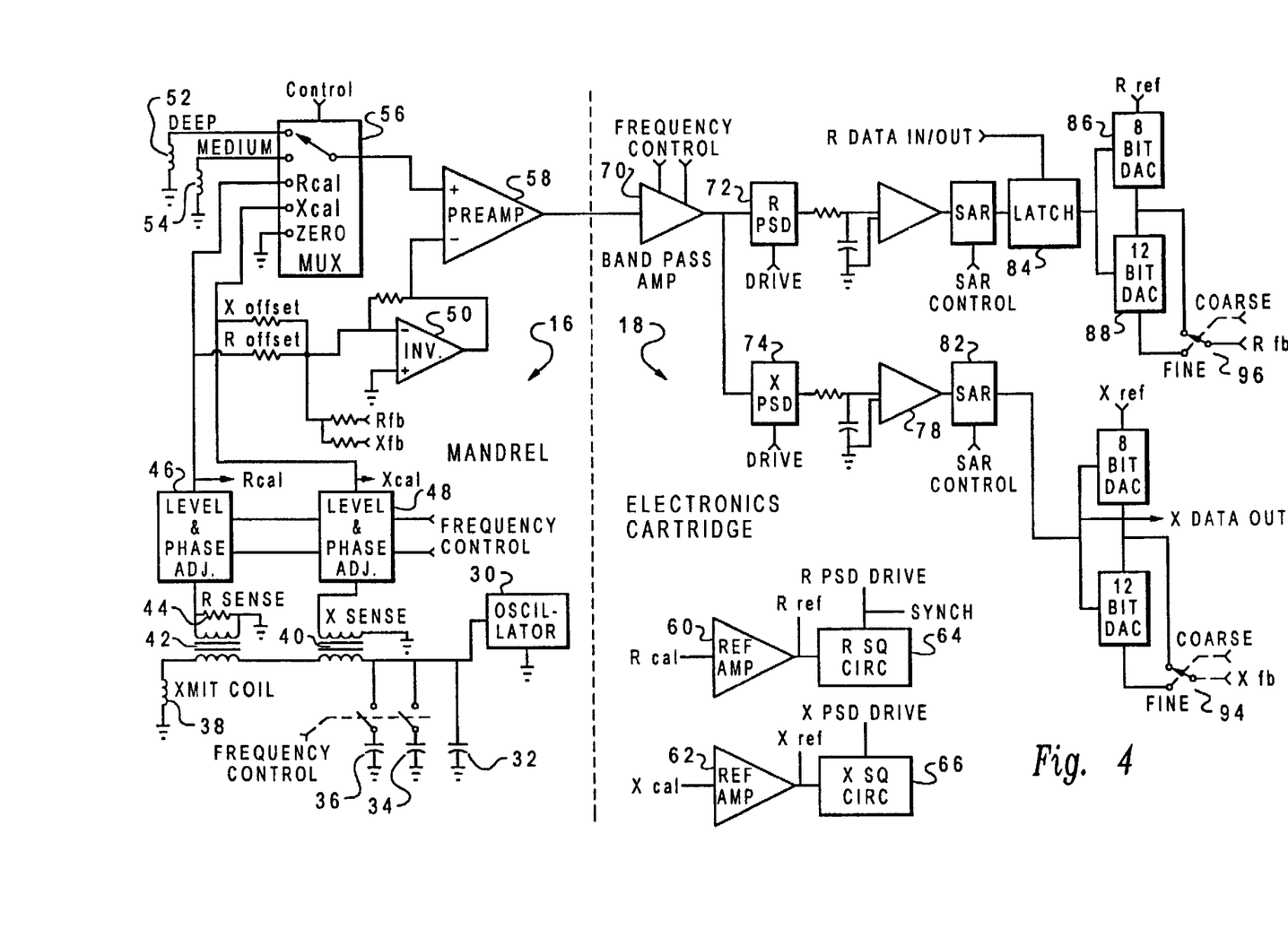
FIG. 4 is a high level schematic diagram of the multiple frequency induction logging system of FIG. 3.

Referring now to FIG. 4, there is depicted a high level schematic diagram of the multiple frequency induction logging system of the present invention. As illustrated, the multiple frequency induction logging system includes an oscillator 30 which is preferably a constant voltage oscillator wherein the output frequency may be controlled by the inductance of transmit coil 38 in parallel with multiple tuning capacitors. As illustrated, tuning capacitors 32, 34 and 36 are provided and by the selective coupling of these tuning capacitors in parallel with transmit coil 38, a highly stable transmitter with low distortion levels may be provided which is capable of transmitting multiple frequencies in a sequential series in a manner known to those having skill in the art as time multiplexing. In the depicted embodiment of the present invention, the selected operating frequencies are 10, 20, and 40 kilohertz.

Transmit current is preferably sampled, in the depicted embodiment in the present invention, utilizing two sense transformers. The R sense transformer 42 is preferably terminated with a low value resistor 44, producing an output which is in phase with the transmitter current. X sense transformer 40 is not terminated, as illustrated, thus producing an output which is in quadrature with the transmitter current.

As depicted within FIG. 4, the outputs of each sense transformer are coupled to level and phase adjust circuits 46 and 48. Level and phase adjust circuits 46 and 48 preferably produce R and X calibration signals which are standardized for a particular receiver coil array, at each operating frequency. As will be explained in greater detail herein, these calibration signals are also preferably utilized to provide reference voltages for digital to analog conversion circuits and phase sensitive detector drive signals.

As illustrated, these calibration signals are also applied to inverter 50 and utilized in conjunction with the output of multiplexer 56 to provide a small amount of offset which permits the multiple frequency induction logging system to measure signals below zero.

As illustrated, multiplexer 56 periodically samples the output of deep receiver coil 52 and medium receiver coil 54, along with the R calibration signal, the X calibration signal and a zero value. These sampled outputs are coupled to preamplifier 58 and the output of preamplifier 58 is then applied to controllable bandpass amplifier 70 within electronics cartridge 18. Controllable bandpass amplifier 70 is preferably controllable about a center frequency which is selected by the controller based upon the transmit frequency in utilization. The gain of bandpass amplifier 70 is also preferably controlled inversely with frequency to produce a constant sensitivity at phase sensitive detectors 72 and 74. In a manner well known to those having ordinary skill in the art, the X and R outputs of controllable bandpass amplifier 70 are then coupled to phase sensitive detectors 72 and 74. In the depicted embodiment of the present invention the total gain of the amplification is sufficiently high to resolve the least significant bit at the analog to digital converter. Assuming sufficient gain, a closed loop conversion circuit is then relatively insensitive to gain, phase or linearity variations of the amplifiers and phase sensitive detectors and gain or phase variations of the driver circuits.

To begin each conversion cycle the previous R value of that sample is loaded into latch 84. This will result in the R digital-to-analog converter 86 and 88 generating an R (Rfb) feedback voltage which nulls most of the R signal at phase sensitive detector 72. With X feedback switch 94 in the coarse position, X successive approximation register 82 is started. Each bit is then either kept or rejected dependent upon the output of comparator 78. After the eighth bit, the phase sensitive detector output is nulled with the resolution of coarse digital-to-analog converter and the feedback is then switched to the fine position. The coarse digital-to-analog converter output is then reconverted with twelve bits of resolution.

This X feedback value is then held while the process is repeated in the R channel. At the end of each conversion cycle, the outputs of both phase sensitive detectors outputs are nulled. Utilizing a successive approximation register approach the quadrature component must be reduced to a reasonable level if there is phase shift in the amplifiers or phase sensitive detectors, otherwise the large quadrature component will cause the successive approximation register to reject a needed bit or add an unneeded bit. Thereafter, the data is transmitted via a telemetry system to the surface for further processing.

Still referring to FIG. 4, the R calibration and X calibration signals are also applied to reference amplifiers 60 and 62 in order to generate reference signals. A synchronization signal and a drive signal for the phase sensitive detectors is then generated by an associated square wave generator 64 or 66.

With reference now to FIG. 5, there is depicted a high level block diagram of a telemetry and control circuit which may be utilized in the multiple frequency induction logging system of the present invention. As illustrated, a telemetry transmitter/receiver 20 is preferably coupled to a controller 98 which, in the depicted embodiment of the present invention, is utilized to couple various control signals to induction logging tool 10 for utilization in the manner described above. As illustrated in FIG. 5, a multiplex control signal, frequency control signal, control signal, course/fine control signal and the successive approximation register signals are transmitted. Additionally, R data and X data and the synchronization signal may be received from the induction logging tool and transmitted to the surface via telemetry transmitter/receiver 20.

Two techniques for correcting for skin effect are disclosed herein.

The first technique utilizes only the R signals and is used when the resistivity is too high to use the X signals. The second technique utilizes the X signals to produce a more accurate skin effect correction in more conductive formations.

At high resistivities (above 10 ohmm), the X signals cannot be used to correct for skin effect. The signal-to-noise ratio is too low. Although the skin effect in high-resistivity formations is lower, it is still large enough that its effect on the logs must be corrected for the deconvolution filters to remain valid. The first technique for computing skin effect at high resistivity utilizes only the R signals and uses the concept of skin depth.

The skin depth for an electromagnetic wave travelling through a conductive medium according to a formula given by J. H. Moran et al. in *Basic Theory of Induction Logging and Application to the Study of Two-Coil Sondes*, Geophysics, Vol. 27, No. 6, Part 1, December 1962, pp. 829–858, is:

$$\text{SKINDEPTH} = \frac{1}{\sqrt{\pi \mu_0 f \sigma}} \quad (2)$$

where, $\pi$ is 3.1415927

$\mu_0$ is the magnetic permeability in henries/meter f is the frequency in Hz $\sigma$ is the conductivity in Siemens/meter The magnetic permeability for air ($4\pi \times 10^{-7}$ henries/meter) is utilized for $\mu_0$. The SKIN DEPTH is the distance an electromagnetic wave will travel until it is attenuated to $e^{-1}$ (approximately 37%) of its original value. Digital logs are recorded at discrete sample points. The distance between sample points, dptinc, is typically 0.5 feet in the English system and 0.125 meters in metric systems. The attenuation a wave experiences while travelling one dptinc is:

$$\text{ATTENUATION} = 1 - \exp(-dptinc \sqrt{\pi \mu_0 f \sigma}) \quad (3)$$

The skin effect is approximated by assuming the skin effect is due to the attenuation of electromagnetic waves travelling from the measure point of the tool to each point of the formation and then back to the measure point of the tool. If the formation is assumed to consist of layers of conductivity $\sigma_i$, where each layer contains one sample point, then the total attenuation of a signal, $\text{ATTENT}_k$, that travels from the measure point to an arbitrary layer k and back is:

$$\text{ATTEN}_k = 1 - \prod_{i=0}^{k} \exp(-2 dptinc \sqrt{\pi \mu_0 f \sigma_i}) \quad (4)$$

where, $\sigma_i$ is the conductivity of layer i. Layer 0 is the layer at the tool measure point. The layers are numbered with positive consecutive numbers in the down direction and with negative consecutive numbers in the up direction.

FIG. 1 illustrates the response function for the deep induction signal when no skin effect is present. A similar response function can be displayed for the medium induction. Thereafter, from the response function, the fraction of the reading contributed by each layer near the tool can be determined. The skin effect can be expressed as:

$$\text{SKIN EFFECT} = \sum_{i=-n}^{n} \sigma_i ATTEN_i wt_i \quad (5)$$

where, $wt_i$ is element i of the vertical response function. This is the fraction of the response that comes from layer i of the formation.

To utilize these equations to compute skin effect, the conductivity of each layer, $\sigma_i$ is required. This is the conductivity that would be measured by a tool with the vertical resolution less than the distance between sample points. Since this is not available, the R signal with the conventional skin effect boost is utilized. To counteract the error from utilizing the log reading for $\sigma_i$, which has low resolution, the weighted response function, WT, is convolved with itself. Then $\overline{WT}$, the result of convolving the weighted response function for each induction with itself, is utilized in the skin effect equation.

The boosted R signal also differs from true conductivity due to other factors such as shoulder bed effect and skin effect errors. To correct for these and other approximations utilized in this method, a normalizing factor, "acald," is used in the equation. This factor varies with conductivity and is a function of the boosted R conductivity. This factor was determined at different conductivities by adjusting acald to give the correct value of skin effect in modeled homogeneous formations. The function utilized to compute this factor was then obtained by data fitting. The final equations for the deep induction skin effect are:

$$ATTENd_k = 1 - \prod_{i=0}^{k} \exp(-2dptinc\, acald \sqrt{\pi\mu_0 f \sigma_i^d}) \quad (6)$$

for $(-n < k < n);\Lambda$ $$\text{SKINEFFECTDEEP} = \sum_{i=-n}^{n} \sigma_i^d ATTENd_i \overline{wtd_i} \quad (7)$$

where, $ATTENd_k$ is the attenuation of a wave travelling from the tool measure point to layer k and back.

$\sigma_i^d$ is the skin effect boosted R signal of the deep induction of frequency f.

$\overline{wtd_i}$ is element I of the deep vertical response filter convolved with itself.

Similarly, the equations for the medium induction are:

$$ATTENm_k = 1 - \prod_{i=0}^{k} \exp(-2dptincacalm \sqrt{\pi\mu_0 f \sigma_i^m}) \quad (8)$$

for $(-n < k < n);\Lambda$ $$\text{SKINEFFECTMEDIUM} = \sum_{i=-n}^{n} \sigma_i^m ATTENm_i \overline{wtm_i} \quad (9)$$

where, $ATTENm_k$ is the attenuation of a wave travelling from the medium induction measure point to layer k and back.

$\sigma^{mi}$ is the skin effect boosted R signal of the medium induction of frequency f.

$\overline{wtm_i}$ is element I of the medium vertical response filter convolved with itself.

These equations are utilized for both the 40 kHz and the 20 kHz R signals. The only differences are that the value for f, the frequency, and the normalizing factors "acald" and "acalm" are specific for each frequency.

For higher conductivities where the X signals are usable, the skin effect can be more accurately determined.

Figure 6:
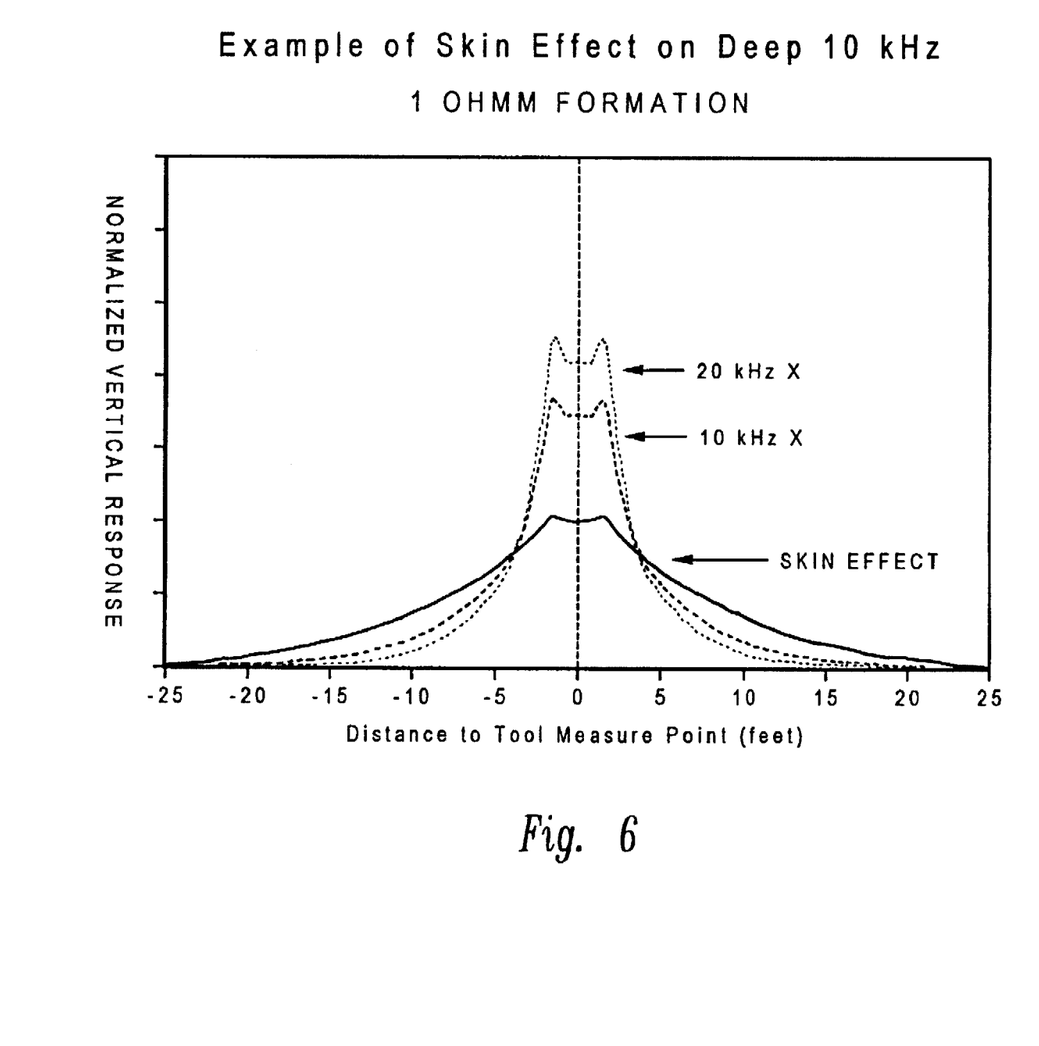
FIG. 6 is a graphic illustration of the response function of the 20 KHz signal, the 10 KHz signal and the skin effect.
Figure 7:
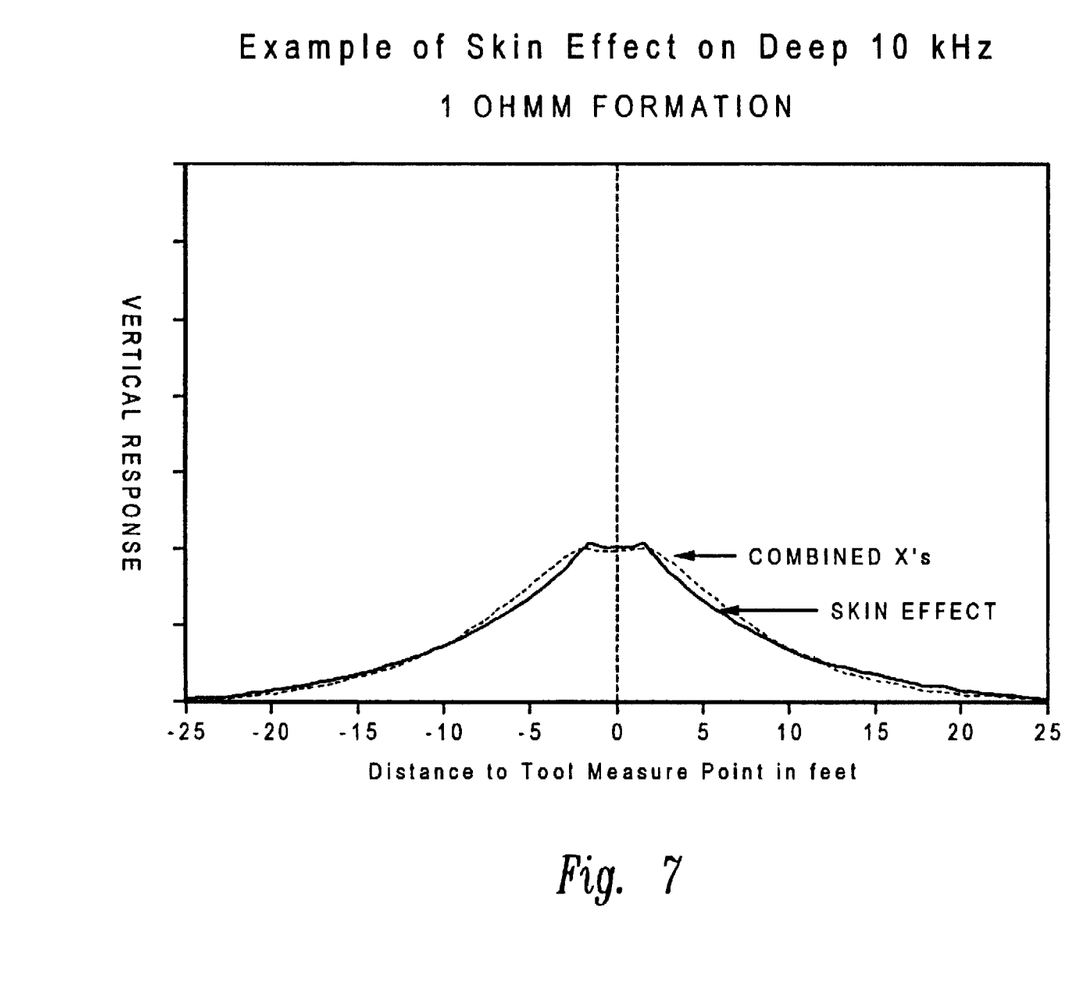
FIG. 7 is a graphic illustration of the combination of the 10 KHz and 20 KHz signals and the skin effect.

The skin effect on both the R and X signals varies not only with the formation conductivity but also with the frequency of the measurement. FIG. 6 illustrates the response function of the 20 kHz X signal along with the 10 kHz X signal and the skin effect. Since the two X signals have a different response, it is possible to combine them by adding some product of the difference between them to the 10 kHz X to produce a skin effect response that will be more correct. FIG. 7 illustrates the response function of the combined X signals.

The equations which may be utilized in the disclosed processing to correct for skin effect in both magnitude and spatial response using combined X signals are:

$$\sigma_{d1sc} = R_{d1} + a_{11}X_{d1} + c_1(a_{11}X_{d1} - a_{12}X_{d2})$$

$$\sigma_{d2sc} = R_{d2} + a_{22}X_{d2} + c_2(a_{22}X_{d2} - a_{24}X_{d4})$$

$$\sigma_{m1sc} = R_{m1} + a_{11}X_{m1} + d_1(a_{11}X_{m1} - a_{12}X_{m2}); \text{ and}$$

$$\sigma_{d2sc} = R_{m2} + b_{22}X_{m2} + d_2(b_{22}X_{m2} - b_{24}X_{m4})$$

where, $\sigma_{d1sc}$—is the skin effect corrected 10 kHz deep conductivity.

$\sigma_{d2sc}$—is the skin effect corrected 20 kHz deep conductivity.

$\sigma_{m1sc}$—is the skin effect corrected 10 kHz medium conductivity.

$\sigma_{m1sc}$—is the skin effect corrected 20 kHz medium conductivity.

$R_{m1}$—is the medium induction 10 kHz R signal.

$R_{m2}$—is the medium induction 20 kHz R signal.

$X_{m1}$—is the medium induction 10 kHz X signal.

$X_{m2}$—is the medium induction 20 kHz X signal.

$X_{m4}$—is the medium induction 40 kHz X signal.

$R_{d1}$—is the deep induction 10 kHz R signal.

$R_{d2}$—is the deep induction 20 kHz R signal.

$X_{d1}$—is the deep induction 10 kHz X signal.

$X_{d2}$—is the deep induction 20 kHz X signal.

$X_{d4}$—is the deep induction 40 kHz X signal.

and $a_{11}, a_{22}, a_{24}, b_{11}, b_{22}, b_{44}, b_{12}, b_{24}$ are parameters utilized to correct the magnitude of each X signal to the value needed to correct for skin effect in homogeneous formations. These parameters are a function of the particular X signal operated upon. The function for each parameter was determined by modeling the deep and medium at each frequency in a homogeneous formation as shown above for the 20 kHz deep. An equation was then computed that fitted the data relating the skin effect to the X signal. The parameters $c_1, c_2, d_1, d_2$, are utilized to correct for spatial effects. Modeling was utilized to determine the value of these parameters so that the combined skin effect correction has the correct spatial response.

These equations correct the R signals for skin effect so that the resulting conductivity is the same as would be obtained if there were no skin effect. The response of the log will be the same as the response at zero conductivity. This correction will not work for all conductivity levels, however. At high conductivities (greater than 1000 mS/m), it is not possible to correct totally for skin effect. Instead, for higher conductivities, the skin effect is corrected to what the 40 kHz deep induction signal would see at 10 ohmm (100 mS/m). The result is then boosted by the amount required for a 40 kHz R signal in a homogeneous formation. The result will be a conductivity corrected for skin effect in magnitude but with the spatial response of the 40 kHz deep induction signal in a homogeneous 10 ohmm formation. At very high conductivities (greater than 2000 mS/m), it will also not be possible to make this skin effect correction accurately. At this conductivity level, the skin effect is corrected to what the 20 kHz deep induction signal would see at 1 ohmm (1000 mS/m) and then boosted by the correct amount. The result will be three different skin-effect-corrected deep conductivities, each of which will be correct at different conductivity ranges. The medium induction is similarly corrected to three skin-effect-corrected levels.

The skin-effect corrections to the 10-ohmm level and the 1-ohmm level are made by the same equations that were utilized above to correct for skin effect to the zero conductivity level. The parameters: $a_{11}$, $a_{22}$, $a_{44}$, $a_{12}$, $a_{24}$, $b_{11}$, $b_{22}$, $b_{44}$, $b_{12}$, $b_{24}$ are determined by modeling to correct the magnitude of each X to the value needed for the 10-ohmm level skin effect and then for the 1-ohmm level. Similarly, the parameters $c_1$, $c_2$, $d_1$, $d_2$ used to correct for spatial effects were specifically determined for the 10-ohmm and the 1-ohmm level. The parameters $c_1$, $c_2$, $d_1$, $d_2$ are constant for the 1000-ohmm level but vary with the X signal value for the 10-ohmm and 1-ohmm level.

Since for each skin effect level the response is constant, a deconvolution filter can be computed for each of the three levels. The deep and medium induction signals are both deconvolved at each of the three levels. The result is three deconvolved deep induction signal curves and three deconvolved medium induction signal curves. Although the response function for each skin-effect level is different, the deconvolved result has the same vertical response function for all three deep induction signal curves. Likewise, the deconvolved medium induction signal curves will all have the same vertical response function. The deconvolution filters for the deep induction signals are designed to remove the side lobes of the response function. This corrects for shoulder bed effects and produces three deep induction signal curves having a resolution of about 6 feet. The deconvolution filters for the medium induction signals are designed to produce medium induction signal curves having a gaussian-shaped response function with a vertical resolution of 2.5 feet.

Figure 8:
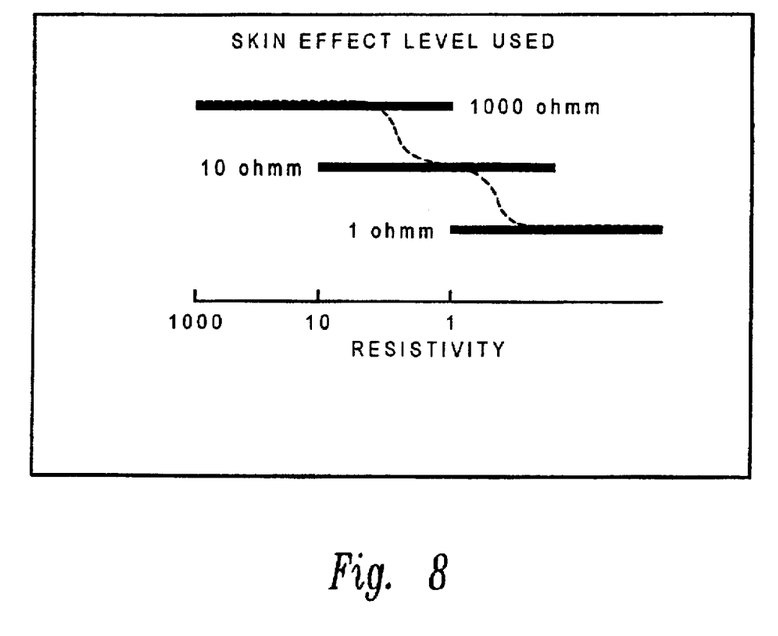
FIG. 8 is a graphic illustration of the resistivity ranges over each of the skin effect corrections disclosed herein may be utilized.

Each of the three deep induction signals and each of the three medium induction signal curves will be valid over the entire resistivity range that is valid to their respective skin-effect correction. The 1000-ohmm skin-effect level correction will be valid for formation resistivities above 1 ohmm. The 10-ohmm skin-effect level correction will be valid for formation resistivities between 10 ohmm and 0.5 ohmm. The 1-ohmm skin-effect level correction will be valid for formation resistivities below 1 ohmm. The final deconvolved value used at each point on the log is determined by the resistivity at that depth. The resistivity utilized to determine the skin-effect level, for both the medium and the deep induction signals, is the deep induction signal utilizing the 1000-ohmm level skin-effect correction. The resistivity range over which each skin-effect correction is utilized as shown in FIG. 8. When the resistivity is above 10 ohmm, the 1000-ohmm skin-effect level is utilized. For resistivities between 10 ohmm and 1 ohmm, a fractional combination of each level is utilized. The percentage of the 1000-ohmm skin-effect level utilized varies from 100% at a resistivity of 10 ohmm to 0% at a resistivity of 1 ohmm, while the usage of the 10-ohmm skin-effect level varies from 0% to 100%. Likewise, between 1-ohmm resistivity and 0.5-ohmm resistivity, a combination of the 10-ohmm skin-effect level and the 1-ohmm skin-effect level is utilized. Below 0.5-ohmm resistivity, the 1-ohmm skin-effect level is utilized.

Figure 9:
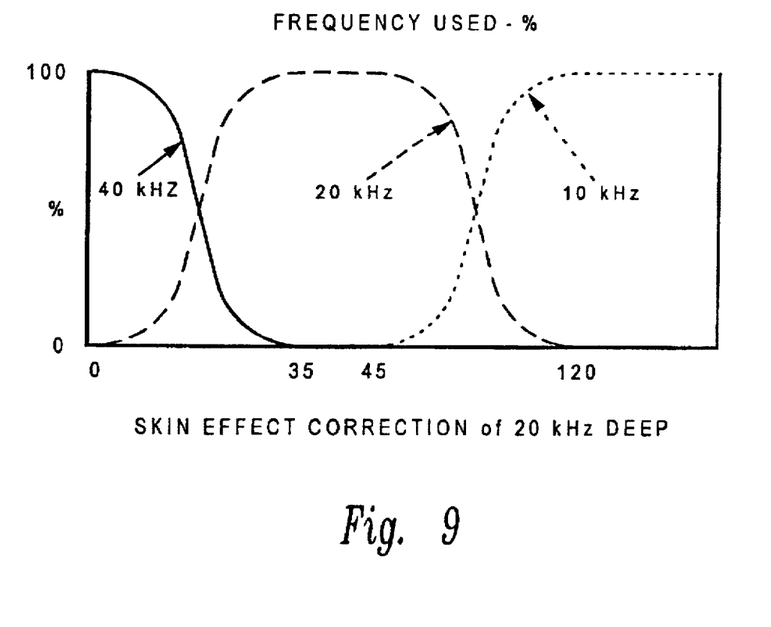
FIG. 9 illustrates the dynamic range over which the R signal of each frequency utilized in a multiple frequency induction logging system may be utilized.

The optimum use of all the data from the induction tool of FIG. 3 requires the use of all three frequencies. The noise-to-signal ratio decreases with frequency, and the skin effect increases with frequency for each induction measurement. Since the 40-kHz measurements have less noise than the 10-kHz measurements, they are more accurate at low conductivities. Since the 10-kHz measurement has a smaller skin effect than the 40 kHz, it is more accurate at high conductivities. To obtain the optimum results, the frequency utilized varies with the skin effect. The dynamic range over which the R signal of each frequency is used for the deep induction signal is shown in FIG. 9. The dynamic range for the medium induction signal is similar.

By using the R signal of the frequency determined by the above plot, the optimum compromise between noise and skin effect may be obtained. The result is a greater dynamic range of measurement than can be obtained from a single-frequency measurement.

Deconvolution as described above may be utilized to correct for both shoulder-bed effects and to enhance log resolution. Deconvolution is performed by utilizing linear deconvolution filters as discussed above. Deconvolution filters will not work if the curve it is applied to has non-linear properties. However, the skin-effect corrections discussed above have effectively removed all the non-linear properties. The elements of the filters are computed utilizing a matrix equation. The medium induction signal is deconvolved to a resolution of 2.5 feet. The deep induction can only be deconvolved to a resolution of about 6 feet. This occurs because the deep induction log does not contain the necessary high-resolution information. To give the deep induction a resolution of 2.5 feet which is comparable to the medium induction signal, a resolution-matching technique is used. The resolution-matching technique utilizes the high-resolution information in one curve (in this case, the deconvolved 2.5-foot resolution medium induction) to improve the resolution of another curve (in this case the deconvolved 6.0-foot resolution deep induction). Details of the resolution-matching technique can be found in Nelson et al. *Improved Resolution of Well Logs by Resolution Matching*, the Log Analyst, Vol. 32, No. 4, July 1991, pp. 339–349.

The multi-frequency measurements of the induction tool of FIG. 3 offer several advantages over single-frequency tools. By combining X signals of different frequencies, accurate skin effect corrections can be made. By utilizing different frequencies at different resistivity ranges, both noise and skin effect can be minimized. This allows a resultant induction log to be resolution enhanced and produces results with greater-than-normal dynamic range.

While the invention has been shown in only one of its forms, it is not thus limited but is susceptible to various changes and modifications without departing from the spirit thereof.

What is claimed is:

1. A method for skin effect correction in a multiple transmit frequency induction logging system, said method comprising the steps of:

transmitting a repetitive sequential series of at least three transmit frequencies into a formation traversed by a borehole;

detecting a signal characteristic of a response of the formation to the repetitive sequential series of at least three transmit frequencies at a receiver coil array;

eliminating phase and gain variations in the detected signal to accurately determine an X signal and R signal component thereof for each of the at least three transmit frequencies; and thereafter, combining the X signal components of at least two transmit frequencies to provide a skin effect correction.

2. The method for skin effect correction in a multiple transmit frequency induction logging system according to claim 1, wherein the step of combining the X signal components of at least two transmit frequencies to provide a skin effect correction further comprises the step of combining the X signal components of at least two transmit frequencies and a correction parameter for each transmit frequency, said correction parameter determined by modeling a response of a homogeneous formation to a particular transmit frequency.

3. A system for skin effect correction in a multiple transmit frequency induction logging system, said system comprising:

means for transmitting a repetitive sequential series of at least three transmit frequencies into a formation traversed by a borehole;

means for detecting a signal characteristic of a response of the formation to the repetitive sequential series of at least three transmit frequencies at a receiver coil array;

means for eliminating phase and gain variations in the detected signal to accurately determine an X signal and R signal component thereof for each of the at least three transmit frequencies; and means for combining the X signal components of at least two transmit frequencies to provide a skin effect correction.

4. The system for skin effect correction in a multiple transmit frequency induction logging system according to claim 3, wherein said at least three transmit frequencies comprise 10 kilohertz, 20 kilohertz and 40 kilohertz.

5. The system for skin effect correction in a multiple transmit frequency induction logging system according to claim 3, wherein said means for eliminating phase and gain variations in the detected signal to accurately determine an X signal and R signal component thereof for each of the at least three transmit frequencies includes two phase sensitive detectors.

6. The system for skin effect correction in a multiple transmit frequency induction logging system according to claim 5, further including a closed loop conversion circuit utilized to null the output of each phase sensitive detector to eliminate phase and gain variations in the detected signal.

\* \* \* \* \*